United States Patent [19]
Kyburz et al.

[11] Patent Number: 5,136,155
[45] Date of Patent: Aug. 4, 1992

[54] BALE REMOVAL MACHINE WITH SENSORY CONTROL PROTECTIVE MECHANISM

[75] Inventors: Martin Kyburz, Andelfingen; Thomas Gloor, Winterthur; Jost Aebli, Winterthur; Daniel Hanselmann, Winterthur; Jurg Faas, Dinhard, all of Switzerland

[73] Assignee: Maschinenfabrik Rieter AG, Winterthur, Switzerland

[21] Appl. No.: 612,957

[22] Filed: Nov. 15, 1990

[30] Foreign Application Priority Data
Dec. 21, 1989 [CH] Switzerland .................. 4600/89

[51] Int. Cl.$^5$ .............................................. G01V 9/04
[52] U.S. Cl. ................................... 250/221; 250/222.1
[58] Field of Search ............... 250/221, 561, 222.1, 250/214 R; 340/555–557

[56] References Cited
U.S. PATENT DOCUMENTS 4,446,602  5/1984  Marx et al. .
4,479,285 10/1984  Ragan ................. 19/64.5
4,563,578  1/1986  Nagai et al. .................. 250/221
4,818,866  4/1989  Weber ........................ 250/221
4,887,070 12/1989  Pinto et al. .

Primary Examiner—David C. Nelms
Assistant Examiner—K. Shami
Attorney, Agent, or Firm—Sandler, Greenblum & Bernstein

[57] ABSTRACT

A bale removal machine having sensory control protective apparatus and a process for the sensory control of the protective apparatus. During at least an initial pass of the bale removal machine along a row of bales, at least one control sensor scans and monitors an area located in the feed direction of the removal member of the machine. If the evaluating unit connected to the control sensors detects a bale, the protective curtains are deactivated immediately before a bale is detected by same. In subsequent removal passes, the protective curtains are activated and deactivated as a function of the known bale profile and/or the control sensor or sensors. If presence of a foreign object, particularly a person, is detected, protective measures are initiated by the protective curtains.

24 Claims, 6 Drawing Sheets

BALE REMOVAL MACHINE WITH SENSORY CONTROL PROTECTIVE MECHANISM

BACKGROUND OF THE INVENTION

1. Field of the Invention

The invention is in the field of industrial textile raw material processing. It relates to processors for the sensory control of a protection system on a textile machine, as well as to a bale removal machine.

2. Related Art

The loosening of bale-like raw material and the successive delivery thereof to cleaning and carding means are generally carried out by the layerwise removal of bales using a rapidly rotating removal roller equipped with tearing pins. Corresponding bale removal machines are, e.g., provided with a removal member, which is guided from above over the raw textile bales arranged in the form of rows.

Exposed parts of the rapidly rotating removal roller can constitute a danger for the operating personnel, particularly if people are working in an unsupervised manner on the machine. This danger always occurs if the downwardly open area of the removal member with the removal roller is not completely and directly over the bale to be processed.

Thus, in the case of such bale removal machines, protective measures are taken. For example, mechanical protective mechanisms are known, such as, e.g., flaps which, as soon as a dangerous situation occurs, cover the danger area and prevent any intrusion into said area. Another mechanical means with mechanical protective mechanisms is known from Swiss patent application 2956/89 of the same Applicant. The latter invention makes use of lateral, rigid or movable protective plates and/or movable covers below the removal rollers.

In addition, protective mechanisms with a sensory system are known from Swiss patent applications 120/89-1 and 4164/89 of the same Applicant. Such means ensure a monitoring of the removal member by means of sensors and/or mechanical protective mechanisms. In the case of purely sensory monitoring, in the front area and/or laterally of the removal member, sensors are provided, which form a protective curtain. If an object penetrates the monitoring area, then it is recorded by the protective curtain and corresponding protective measures are initiated.

In the case of the sensory monitoring of the danger area of the removal member, the difficulty exists that any object is detected by the sensors and, in particular, also the textile bales. Thus, according to a preferred variant of the aforementioned bale removal machines of Swiss patent applications 120/89-1 and 4164/89, it is proposed to use infrared sensors, which do not detect the actual textile bales. However, when infrared sensors are used difficulties can be encountered by pronounced fluctuations in the ambient temperature.

In order to avoid undesired reactions of the sensor system in the case of sensors which also detect the bales, Swiss patent application 4164/89 proposes that account be taken of the bale profile. However, for using the bale profile the latter must be known, or it must be possible to reveal it to the machine by scanning. In the case of an unknown bale profile or, if no prior scanning of the bale profile is possible, said measure proves to be inadequate.

SUMMARY OF THE INVENTION

An object of the invention is to so improve the bale removal machines of the aforementioned type, that even when the bale profile is unknown and/or the environmental conditions are difficult, the sensory control protective measures occur in a reliable form.

It is a further object of the invention to provide a corresponding process, which allows an optimized use of sensory and/or mechanical protection means on a bale removal machine, whilst also activating the protective means in good time.

BRIEF DESCRIPTION OF THE DRAWINGS

The invention is described in greater detail hereinafter relative to embodiments and the attached drawings, wherein.

DETAILED DESCRIPTION OF PREFERRED EMBODIMENTS

Figure 1:
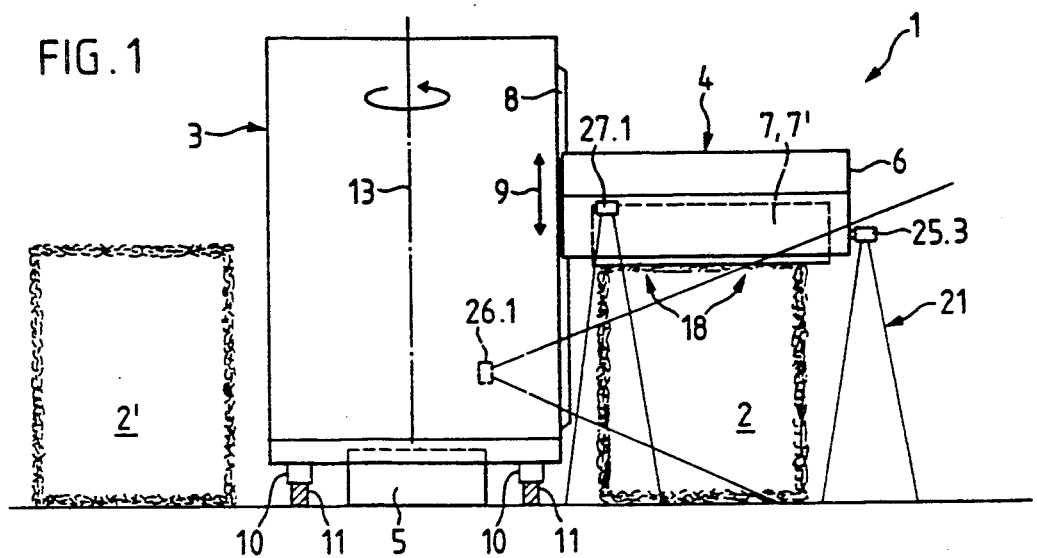
FIG. 1 illustrates a textile fibre bale removal machine with sensory protective curtains in side view.
Figure 2:
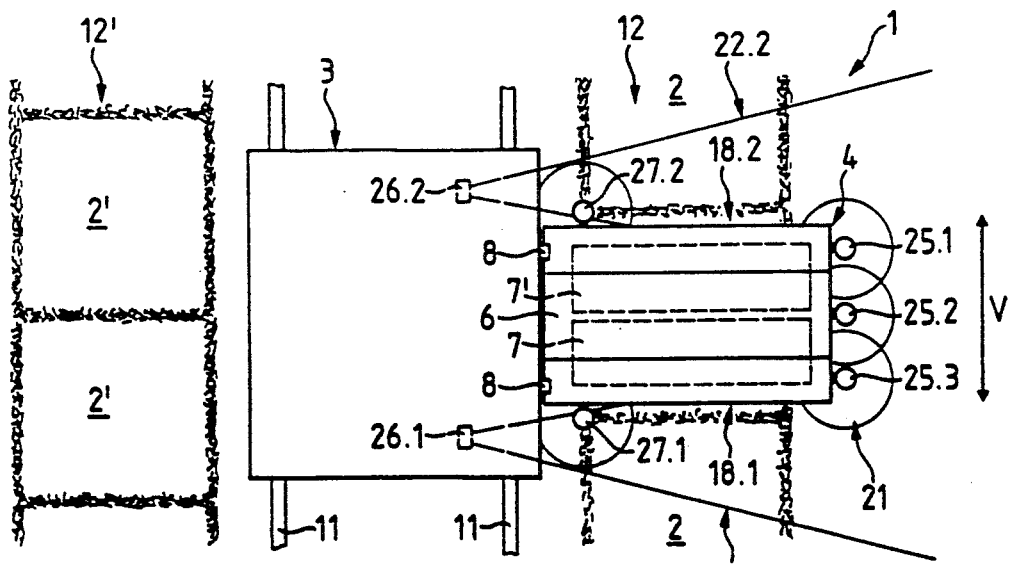
FIG. 2 illustrates a textile fibre bale removal machine of FIG. 1 in a plan view.

FIGS. 1 and 2 show a textile fibre bale removal machine with sensory protective curtains in side view (FIG. 1) and in plan view (FIG. 2). The machine 1 for removing textile fibres, present in the form of bales 2, comprises a machine frame 3 with a removal member 4 and a flock transport channel 5. The machine frame together with the removal member 4 can be moved in two advance or feed directions V.

The removal member 4 contains a casing construction 6, in which are drivably mounted one or more rotary removal rollers 7, 7'. The fibre flocks removed from the fibre bales 2 by the removal rollers are passed through the casing construction 6 and a not shown ventilation means, in known manner, into the flock transportation channel 5. The removal member 4 is displaceable in the vertical direction along a guide rail 8 (indicated by arrow 9 in FIG. 1), so as to be placed upon the bales, is raised therefrom and is movable by a variable removal height. In addition, the upper part of the casing construction is rotatable about a vertical axis 13, so that the removal member can be rotated by 180°, so as to be able to remove a second row of fibre bales 2' located on the opposite side.

On its underside the machine frame 3 is provided with drivable wheels 10, making it possible to move the textile fibre bale removal machine 1 on rails 11 along the fibre bale row 12, or 12' (cf. FIG. 2). Thus, by reciprocating the entire machine 1 and simultaneously raising or lowering the removal member 4, the row-wise arranged fibre bales 2, 2' can be removed layer-wise. The fibre flocks are continuously supplied for further processing by means of the flock transportation channel 5.

A frontal protective curtain 21 is formed by several sensors 25.1 to 25.3 on the front of the removal member 4. A lateral protective curtain 22.1, 22.2 is provided laterally of each removal member 4. In this embodiment the lateral protective curtain 22.1, 22.2 are in each case covered by a first sensor 26.1, 26.2 located in the lateral area of the machine frame 3 and by a second sensor 27.1, 27.2, which is fixed laterally to the removal member 4. The arrangement of the sensors and the principles of the construction of such protective curtains are described in greater detail in Swiss patent applications 120/89-1 and 4164/89. The content of these patent applications is here assume as known.

1. Operation of the Sensor System

According to the invention, the described protective curtains are controlled or regulated in such a way that the protective system functions in an optimum manner. In other words, if a specific object penetrates the monitoring area, a protection measure is to take place with high reliability and safety. Conversely, unnecessary protection measures and, in particular, disconnections are to be avoided. The protection measures are constituted by an emergency disconnection of the removal rollers (mechanical or electrical brake), the operation of mechanical protection means (covers, drawing the roller into the casing, etc.), warning signals, etc. The main difficulty is that although protective curtains must be present laterally of the removal member, they are constantly traversed by textile bales, which must not initiate any protective measures. Similar difficulties are not generally encountered for the frontal protective curtain (parallel to the movement direction of the removal machine).

The invention takes account of three fundamentally different sensor principles, in order to master the aforementioned difficulty for the lateral protective curtains. The protective sensors used are based on a detector principle not responding to textile bales. Such sensors are referred to hereinafter as "bale-neutral sensors". The protective sensors used can differentiate by means of a switched-in intelligence between textile bales and other objects, so that no alarm signal is generated as a result of the presence of bales. Such sensors are referred to hereinafter as "intelligent sensors". The protective sensors used are neither bale-neutral, nor intelligent, but are so controlled by a superior intelligence, that they are only active when a hazard is in fact possible.

1.1 Bale-neutral Sensors as Protective Sensors

As stated, bale-neutral sensors are detector means which do not detect the textile bales, i.e., do not react with an alarm signal to bales entering their monitoring area, whereas they do react with an alarm signal to another, endangering object. Such sensors can remain permanently active during the operation of the bale removal machine, without initiating or triggering false alarms or false protection measures through bales coming into the vicinity of the sensors. The special advantage of using such bale-neutral sensors as protection sensors is that the alarm signals generated by them can be used without further processing, i.e., without any time loss, as a trigger for protective measures.

The use of passive infrared sensors for the protective curtains leads to such a bale-neutral sensor system. As the textile bales have the same temperature as the surrounding area or no radiation difference exists compared therewith (temperature gradient over the bale, including the floor is lgrad $T1 \approx 0$), the textile bales are not detected by the protective curtains. However, thermal radiation comes from a human being, so that he is detected.

The use of bale-neutral sensors can be influenced by the surrounding area, which can lead to false measures. In order to prevent this, the following correction measures are taken alone or in cumulative manner according to the invention. The signals of the protective sensors are compared with the signals of a reference sensor, which is positioned in such a way that no endangered object can enter its vicinity. Alarm signals which are triggered simultaneously by the protective sensors and the reference sensor are suppressed. The signals of the individual protective sensors are permanently compared. Identical alarm signals from protective sensors positioned in such a way that they cannot respond simultaneously to an endangered object are suppressed. The disturbing influences are measured by a reference sensor and the sensitivity of the protective sensors is regulated in such a way that they do not react to disturbing or interfering influences.

The use of such correction measures requires an additional processing of the sensor signals, which requires a certain amount of time. When choosing such correction measures, it must be borne in mind that during the time in which the sensor signals are processed, the machine is moving on and the danger is coming closer to the endangered object. As a function of the distance of the detection areas of the sensors from the effective danger zone, the speed of the machine and the generally officially fixed minimum distance between the danger and the endangered object at the time of triggering the alarm, it is possible to calculate the maximum acceptable time available for evaluating the signals. Thus, correction measures must be used, which leads to the best prevention of false measures in a tolerable period of time.

The use of passive infrared sensors can lead to problems in conjunction with thermal disturbance or interference sources, e.g., existing cold/warm air flows. In order to avoid unnecessary protective measures, a control means links the signals of several sensors and/or at least one reference sensor is used. By a continuous comparison of the signals of several infrared sensors, alarm signals triggered by an endangered object can be better differentiated from those emanating from the surrounding area, such as the ground or floor. It is possible, e.g., to exclude a person being simultaneously detected by two sensors, which are a certain minimum distance apart. According to a preferred embodiment this minimum distance is 1.2 m. Preferably, the reciprocal geometrical arrangement of the sensors is also utilized. It is excluded that a person is simultaneously detected by protective curtains arranged on different sides of the removal member, e.g., simultaneously by the screen of sensors 26.1/27.1 and by the screen of sensors 26.2/27.2 in FIG. 2. If through the two protective curtains signal courses or paths are obtained, which are similar or whose correlation reaches a specific value, it can be concluded therefrom that there is an environmental influence, so that no protective measures are initiated. The minimum demands made on a correlation for suppressing an alarm signal can be given for the particular use area.

Disturbing influences can also be determined by means of a reference sensor, which is fitted in an inaccessible area or outside the monitoring area of the machine. By means of the sensor control either the sensors are correspondingly controlled (e.g., reducing sensitivity), or the signals received from them are correspondingly filtered.

In the case of infrared sensors, it is more particularly possible to adapt the sensitivity in order to prevent an undesired response. The ambient temperature is measured by a reference sensor. In the case of low temperatures the sensitivity of the sensor system is controlled back or regulated, whereas the system sensitivity is increased for a high ambient temperature. This can be brought about in that in a cold environment the temperature difference between the latter and the human being is higher, so that the temperature gradient at the body-environment transition is raised, which in turn means that a passive infrared sensor receives a larger signal. This ensures that in the case of a cool ambient temperature frequently occurring, hot air flows do not trigger an undesired signal. A control can be provided, e.g., in such way that in periodically recurring test cycles a heater located in the detection area of a reference sensor, e.g., is activated. The amplitude of the output signal is the quantity to be regulated and is kept at a desired or preset value, independently of environmental or ambient parameters such as temperature, contamination, etc. It is obviously also possible to regulate or control the sensitivity of the sensor system as a function of other parameters. A preferred variant is that for control purposes the transmission power and/or sensitivity of the sensors is modified.

Other bale-neutral sensors are wired, controlled or regulated in the same way.

1.2. Intelligent sensors as Protective Sensors

Intelligent sensors are detector systems which, although recording textile bales, through a possibly intelligent detection system can differentiate bales from other objects, e.g., a pattern-detecting image processing system. For this purpose preference is given to the use of a computer which, by means of the received signal (shape, intensity, pulse length, etc.) determines the nature of the object. In principle, such intelligent sensors can be used in the same way as bale-neutral sensors and correction measures for eliminating disturbing influences can be directly incorporated into the processing of the signal supplied by the detector.

In much the same way as for correction measures for signals for bale-neutral sensors, the time required for receiving and evaluating the signals is decisive for this concept. The possibly occurring down-time between the detection and the passing on of a signal processed to an alarm signal is limited by the distance between the protective curtain and the effective danger zone (removal rollers), which can be assumed as predetermined. High demands must be made on such intelligent sensors, because they must not only be able to perfectly detect the bales, but must also be able to detect every other object passing into the danger area from any direction and which can have an almost random size.

The first-mentioned difficulty of a down-time can be eliminated by using at least one "predicting" sensor (hereinafter called control sensor), a system which will be described in greater detail hereinafter. The high demands made on the intelligent sensors can be taken into account in that different functions are allocated to the different sensors of the protective curtain, so that it is possible to use more specific and therefore less complicated sensors, or in that signals from different sensors are combined by an evaluation unit into an "intelligence" signal. In other words, such a system is a combination of a system with intelligent protective sensors and a system with control sensors.

1.3. Protective Sensors controlled by a Superior Intelligence

If neither bale-neutral, nor intelligent sensors are used for the lateral protective curtains, use is made of a superior intelligence, which either switches off the sensors at the time before a textile bale passes through the protective curtain, or suppresses its alarm signal if it is caused by a bale. Such a superior intelligence must either have knowledge of the arrangement of the bales in the range of the bale removal machine, or it must be able to distinguish bales from other objects. The superior intelligence is brought about in two possible ways. The intelligent system either learns the initial bale profile by a learning process or by the manual action of an operator and is updated during the removal process by means of the known removal sequence in the vertical direction. Alternatively, the intelligent system evaluates the signal of a control sensor positioned upstream of the removal member in the removal direction to establish where bales are and are not located. Thus, unlike in the case of the process with intelligent sensors as protective means, here the intelligent function and the protective function are spatially and consequently also time separated, so that the down-time aspect mentioned in connection with intelligent sensors does not apply. The demanding function of the intelligent protective sensor is also divided, in that the control sensor only has to detect bales, whereas the endangered objects are detected by the protective sensors.

The idea of a sensor system controlled by a superior intelligence is based on the fact that the textile bales are incorporated into the protective concept. For as long as the removal member 4 does laterally overlap the bales in the free areas (cf. FIG. 2), there is no possibility of a person penetrating the danger areas 18.1, 18.2 from the side. In this case the sensors of the lateral protective curtains 22.1, 22.2 do not have to be active. Thus, during the removal process time or during the occurrence of local stages which can be established, the sensors of the lateral protective curtains 22.1, 22.2 do not have to be active, because the protective function is then fulfilled by the textile bales.

The bale profile, which is necessary for performing the first-mentioned process for the control of the protective sensors or the activating or deactivating of the monitoring areas, can be established in conventional manner. A process for determining the bale profile is known, e.g., from German patent 39 26 482.3.

In modern installations the bale profile is regularly measured and the data stored and evaluated in a computer. Therefore, they are also available for controlling the safety system.

Information on the bale profile is acquired during the first passage through the removal machine. During this first passage, the sensors enable the reading in of a topographical picture of the bale appearance, which is then stored in a computer. In the following passages said information is utilized for correspondingly controlling the bale shape monitoring areas. Account is taken of the fact that the envelope of monitoring areas and fixed objects (bales) formed around the danger area is kept closed at all times. For example, feelers are used as sensors and their maximum detection ranges are controlled in accordance with the bale shape. Thus, their maximum detection ranges are controlled just above the surface of the bale or floor. If objects occur within the controlled detection area of the sensors, they cannot belong to the bale profile and must instead be endangered objects. When using distance measuring devices the sensors can continuously measure the distance between the removal member and the object located below it (floor, bale or disturbing object) throughout the operating process, the known bale profile being compared with the test values obtained. It is appropriate if each detected object leads to an alarm signal. Obviously with this process it is simple to monitor as a danger area the area above bales which, for some reason, are lower than the remaining bales in the row.

As the height of the bale appearance changes as a result of the removal process and consequently so does the working height of the removal member, the stored image of the bale appearance must be permanently updated, so that the described process can be correctly performed. This presents no problem, because the delivery of the removal member is known. It is also conceivable to carry out periodic control measurements in order to check or correct the values of the calculated bale shapes. There is no need to interrupt the monitoring operation for this purpose and, therefore, the processing operation, because said control measurements can be carried out in a very short time (<0.1 sec).

A disadvantage of the process with known bale appearance is the need for the initial passage for the initial detection of the bale profile. This initial passage must be carried out either with stationary removal rollers or with a very limited protection means, unless a special protection process is available for it (e.g., mechanical protection means). Thus, use is preferably made of the second process using control sensors. These control sensors supply a signal enabling a decision to be made as to whether an object coming into the vicinity of the protective sensors is a bale. If such sensors are installed, they can also be operated as control sensors throughout the removal process, which renders superfluous the recording and the updating of the bale profile. This process is also advantageous for re-equipping older means, which do not have the capacity to store the bale profile and update it during the removal process.

For the process using control sensors, the protective sensors can be in the form of sensors detecting the textile bales and in particular can be ultrasonic and optical sensors. As the frontal area of the removal member 4 overlaps the bales, the corresponding sensors 25.1 to 25.3 are permanently active. The activation of the lateral protective curtains is essentially dependent on the position of the removal member relative to the bales positioned in the row.

Figure 3:
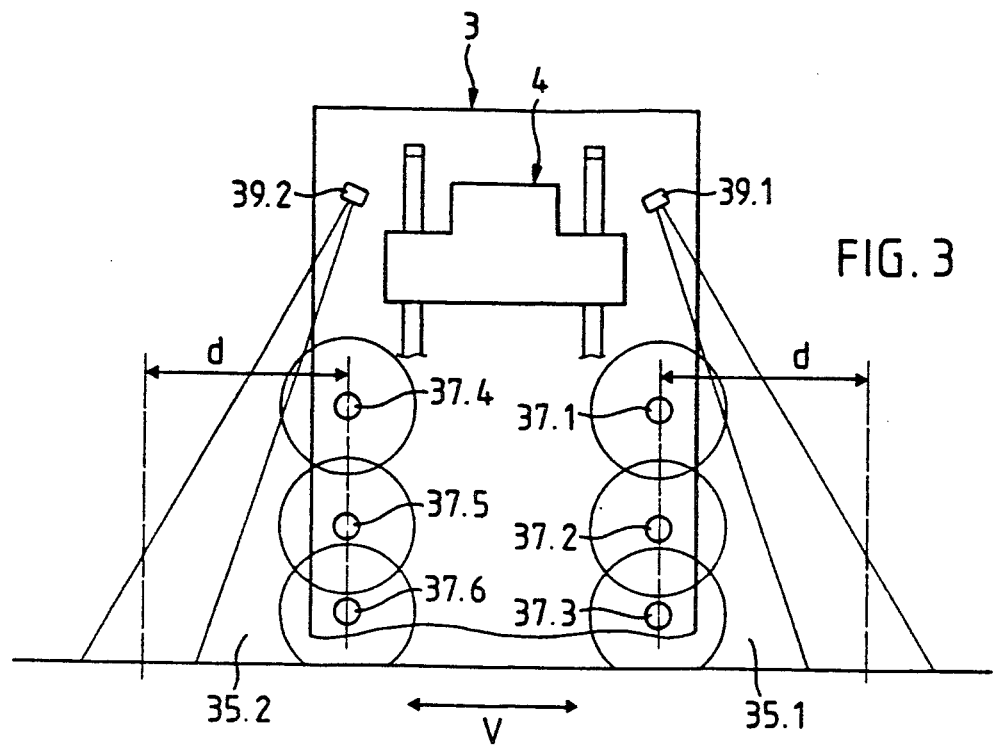
FIG. 3 illustrates a textile fibre bale removal machine, additionally equipped with control sensors in front view.

An embodiment of the apparatus required for performing the process with control sensors is illustrated in FIG. 3 with respect to a bale removal machine viewed from the front. The vertical adjustable removal member 4 is fixed on a machine frame 3 moving in the direction of arrow V. Six horizontally oriented ultrasonic detectors 37.1 to 37.6 form two vertical protective curtains 35.1, 35.2 laterally of the removal member 4. Two control sensors 39.1, 39.2 associated with, in each case, one of the protective curtains, detect an area laterally of the protective curtains at a distance d therefrom.

The control sensors are here constituted by distance measuring devices preferably functioning on an ultrasonic basis. It is obviously also possible to use simple feelers, but then the maximum possible information is not acquired, which may be prejudicial to safety. The control sensors 39.1, 39.2 here detect objects, particularly bales, prior to any detection by the protective curtains. This time difference is utilized to receive and evaluate the information from the control sensors, in the sense that bales are differentiated from other objects which may be detected. The detection barrier or range of the control sensors covers the objects located along the bale removal path before same come into the area of a protective curtain and said time at least corresponds to the value $t_d = d/v$, in which v is the relative speed of the machine/bale and d is the distance between the detection area of the control sensor and detection areas of the protective curtain.

The protective sensors are then controlled in accordance with the nature of the detected object, i.e., they are activated/deactivated, their range is adjusted, the alarm signals are correspondingly filtered or otherwise processed or additional measures are taken. In a special variant of the arrangement according to FIG. 3, the ultrasonic detectors 37.1 to 37.6 and/or control sensors 39.1, 39.2 are positioned in a vertically adjustable manner, so that they can follow the movement of the removal member 4.

Figure 4:
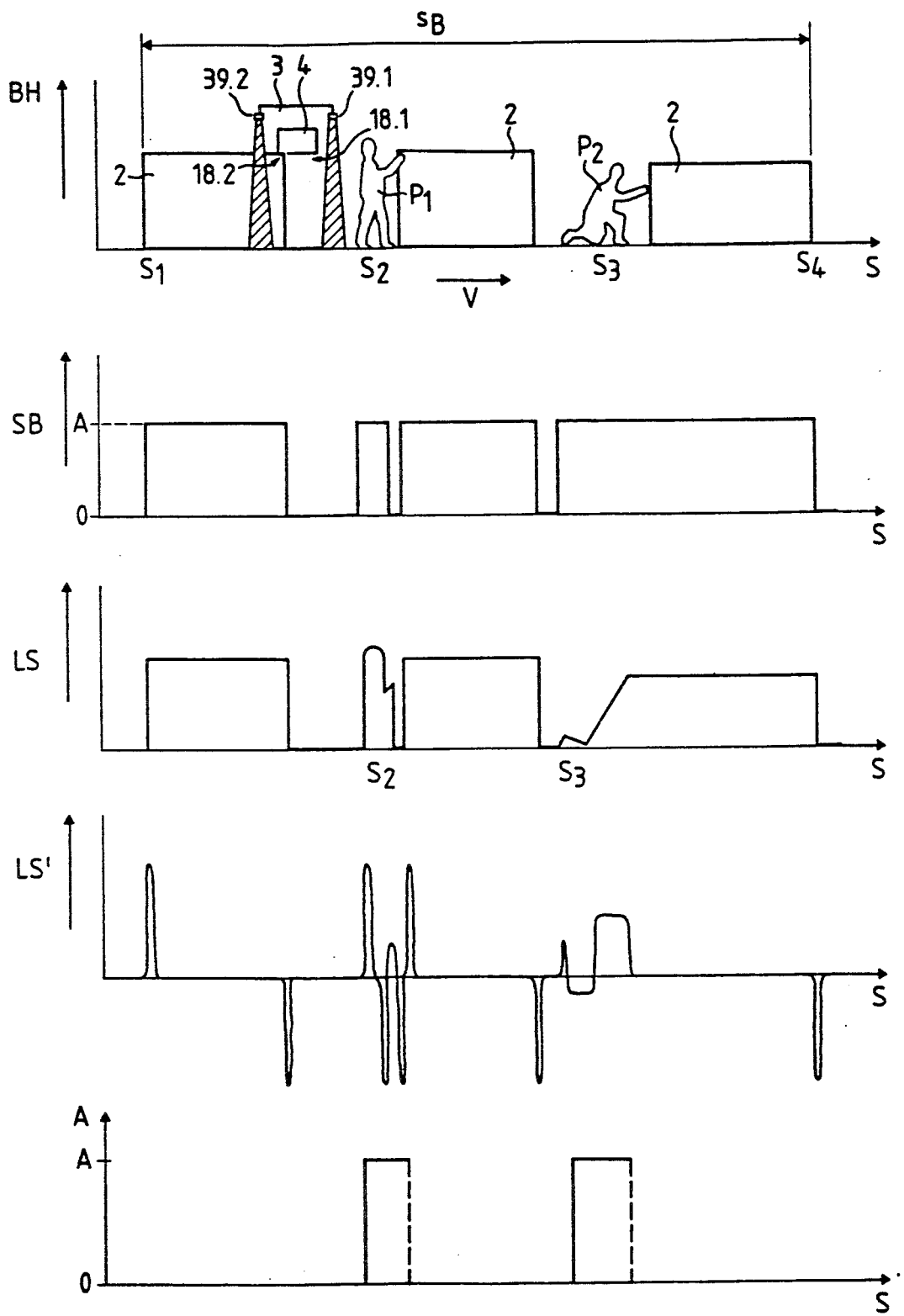
FIG. 4 Diagrammatically illustrates an operating principle of the protective mechanism controlled by control sensors.

FIG. 4 illustrates the inventive process on an example. In the top portion of the drawing (diagram BH), diagrammatically shown is a bale arrangement on a path portion $s_B$ between the two points $S_1$ and $S_4$. At points $S_2$ and $S_3$ in said path portion $s_B$ is in each case located a person $P_1$ and $P_2$. These persons are potentially endangered by the removal member 4 moving in direction V over bale 2. The lateral danger areas 18.1, 18.2, upstream of which are positioned the detection areas of two control sensors 39.1, 39.2 fitted to the machine frame 3, move in the feed direction together with the removal member.

In diagram SB below it is imaged the "picture", which would be given by a neither bale-neutral, nor intelligent protection sensor of the facts of diagram BH and in which there are two levels, namely zero for "no alarm" and A for "alarm". A high sensitivity demand is made on such protective sensors. They have to detect each object in their detection area. Thus, each bale and also each other object leads to an alarm signal. The function of the superior intelligence is to detect and suppress an alarm signal triggered by a bale.

In the diagram LS, the "picture" detected by the control sensors 39.1, 39.2 is shown over the path portion $s_B$, here, e.g., for the case that the control sensor is constituted by a distance sensor. The height of all the objects is represented as a function of the path or distance S. The two persons $P_1$ and $P_2$ are also detected and are apparent from the signal path at points $S_2$ and $S_3$. In the case of such a picture of the objects in the working area of the bale removal machine, in order to be able to distinguish bales from other objects, use can be made, e.g., of the fact that the bales substantially have a rectangular shape, so that their surfaces are either vertical or horizontal, which is not, e.g., the case for an endangered person. Use can also be made of the fact that a bale or a row of bales has a minimum length. In the diagram LS' below, the derivation of the signal path of the diagram LS is diagrammatically represented. Bales are limited by a positive deflection and a negative deflection, between which the derivation is zero. At $S_2$ and $S_3$ the diagram also has other values, i.e., a bale may not be involved. The first positive deflection for the person at $S_2$ could admittedly simulate the start of a bale for a not very accurate interpretation. However, since immediately a negative deflection follows, the minimum bale length condition is not fulfilled, so that a bale can be excluded.

If the signal path of the diagram LS' is now to be used for controlling the protective sensors, this means that a positive minimum deflection, according to which the size or magnitude LS' becomes and remains zero, the protective sensors are deactivated and the following negative minimum deflection reactivates the protective sensors. It must be ensured that the system is only able to follow the remaining of the signal LS' at zero for as long as the observed object is in the vicinity of the protective sensors, i.e., until the removal machine has covered the distance d (cf. FIG. 3), because then at the latest the protective sensors must be deactivated for a bale. Thus, for a system with limited resolution, which perceives an upright human being, e.g., only as a rectangle, the distance d must at least correspond to the width of a standing person. The protective sensors of the rear protective curtain (related to the feed direction) are additionally deactivated and also reactivated with a delay $\Delta t$ which, for a specific feed speed v, corresponds to the distance between the front and rear protective curtain. It must in particular be ensured here that when a machine is switched in (start of work), the protective sensors of the position of the removal member or, more precisely, the position of the control sensor are correspondingly activated or not activated.

The final diagram of FIG. 4 shows the signal passed by the control protective sensors to the protective mechanisms and in which once again zero is no alarm and A is alarm. It is clear that the sensors at points $S_2$ and $S_3$, where human beings are located, supply alarm signals.

FIG. 4 could be misunderstood to the extent that it could give the appearance that the human beings positioned between the bales must be detected by the control sensors. This is not the case and, on the contrary, is only intended to show that the control sensors faultlessly fulfil their function of distinguishing whether or not the removal machine is moving or not towards a bale, even if there are other objects between the bales. If the control sensor can effectively detect an endangered object, it is not necessary to wait for the protective sensors in order to trigger an alarm. In such a case the control sensor can and should directly trigger the alarm signal. However, normally the detection range of the control sensors is smaller than that of the protective sensors, whilst their sensitivity is also weaker than that of the protective sensors, so that only in exceptional cases when human beings are completely located between the bales, are they able to reliably detect endangered objects. Their main function is to establish when the removal machine is approaching a bale and, therefore, whether or not the protective function can be transferred from the protective sensors to the bales.

The first embodiment of the invention described relative to FIG. 4 cannot monitor a space above a bale, which is smaller than the surrounding bales. However, such a space above a bale constitutes a hazard for careless personnel. In order to be able to incorporate such spaces into the protective scope of the protective sensors, according to a preferred variant of the process the height of the bale, is recorded, e.g., by the control sensor, and the protective curtain of the protective sensors is reduced by corresponding measures by the height of the bale. In the same way, this can take account of a raising of the removal member above the bale, which may be necessary in special cases. In other words, the monitoring area of the protective curtains 21 to 23 is continuously adapted as a function of the bale profile determined or calculated by the control sensors 39 in such a way that the space or area taken up by the textile bales 2, 2' is not detected by the protective curtains 21 to 23.

The special advantage of the process with control sensors compared with that with bale-neutral or intelligent protective sensors is that the functions can be divided up over different sensors, so that it is possible to use very special and therefore very accurate sensors. In addition, through the evaluation of the control sensor signal when an alarm signal is received from the protective sensors, the system is already brought into a state such that it can initiate protective measures without losing time for the further processing of the alarm signal from the protective sensors.

Figure 5:
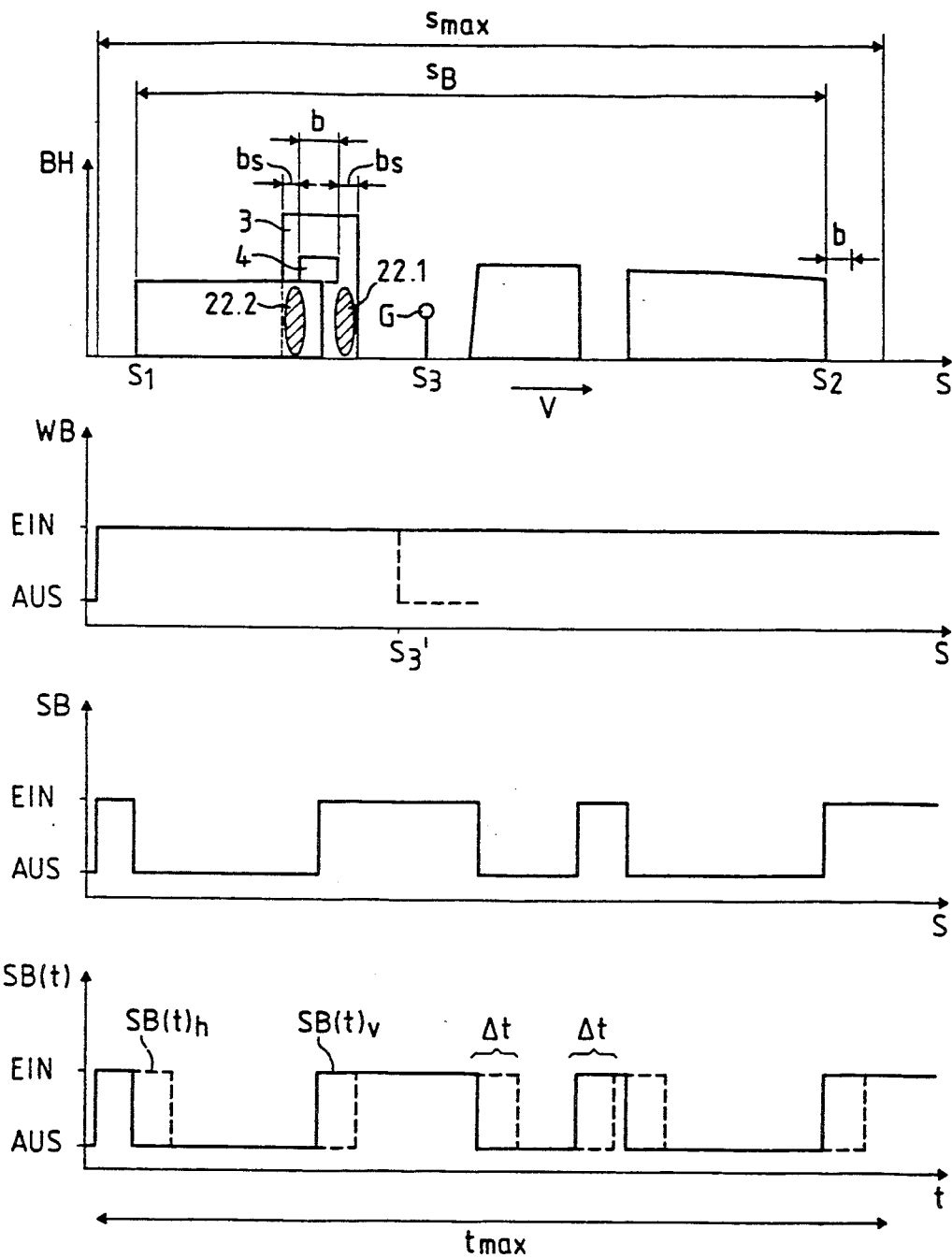
FIG. 5 Diagrammatically illustrates a control of the protective mechanism and removal machine by control sensors.

FIG. 5 illustrates the use of the control sensor signals for the control of the protective curtains or the machine operation. In the top diagram, BH once again indicates an exemplified bale profile over a distance or path $s_B$. A disturbing object G (e.g., a human arm) is indicated at a point $S_3$ in the central area of the path portion. $s_{max}$ indicates the maximum distance in which a bale or the removal member can be positioned. The machine frame 3 with removal member 4 are shown diagrammatically. The removal member 4 has a width b and moves with the machine frame 3 in the direction of arrow V.

In the underlying diagram WB is shown the roller operation sequence, where "on" indicates that the rollers are rotating and "off" indicates that either the rollers are switched off or that other protective measures are taken for excluding a risk of injury (e.g., covering the rollers).

The third diagram shows the sensor readiness SB as a function of the removal member position. It is clear that sensor readiness, i.e., the active sensory monitoring by means of the protective curtains 22, and mechanical shielding of the removal member 4 by textile bales alternate continuously. It is also clear that this ensures that in areas which could be penetrated by persons, such persons are detected by the active sensor readiness.

The bottom diagram shows the time-related sensor readiness $SB(t)$. $t_{max}$ is the time required by the machine for passing through the maximum distance. $SB(t)_v$ is the sensory activation of the protective curtain 22.1 located at the front in the movement direction, whilst $SB(t)_h$ is that of the protective curtain 22.2. The rear protective curtain in the movement direction is always deactivated and reactivated with the delay $\Delta t$. On switching off the machine, sensor readiness must persist until the rollers have completely stopped.

The object G indicated at point $S_3$ is obviously in a path portion on which the protective sensors are active, i.e., it triggers an alarm signal leading to the initiation of protective measures. Here these consist of a switching off of roller operation, together with any warning measures. At this time the removal member is still at point $S_3'$. The running time of the removal member up to the object G (time between $S_3'$ and $S_3$) is sufficient to ensure that the protective measure is effective. The disconnection of roller operation is indicated in diagram WB of FIG. 5 by a broken line.

The necessary distance d between the monitoring area and the detection area of the control sensor or sensors is only dependent on the time required by the intelligence to decide whether the detected object is or is not a bale and in order to correspondingly set the status of the protective sensors. The necessary distance $b_s$ of the detection area of the protective sensors from the effective danger zone (removal member or rollers) is on the one hand dependent on the time required to put protective measures into operation and on the other on the maximum relative speed with which an endangered object can move in the direction of the danger area.

Figure 6:
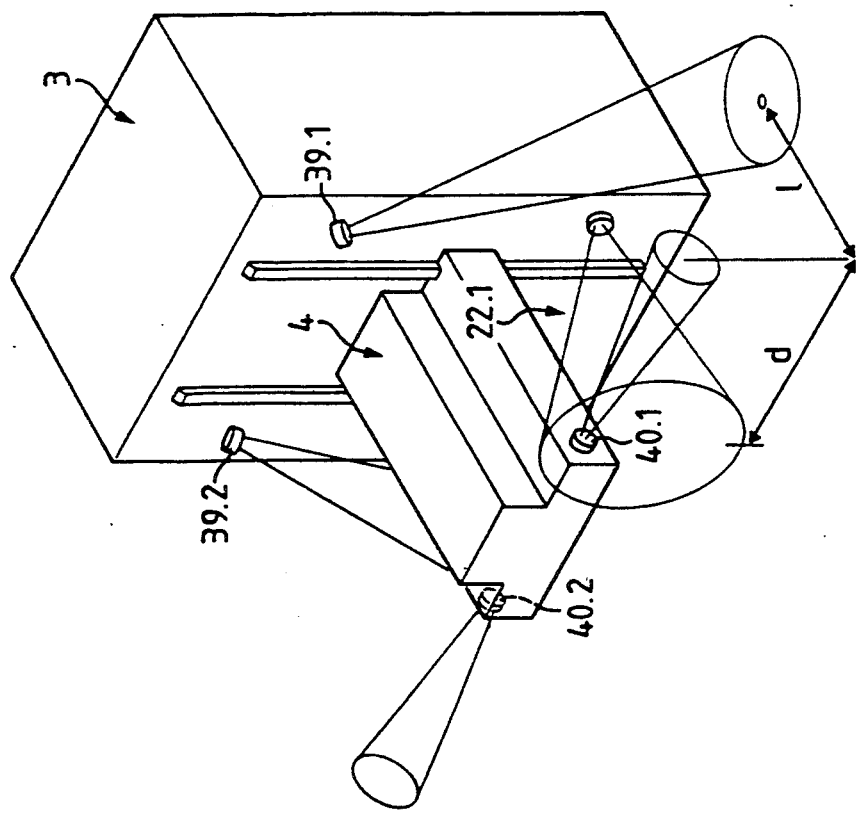
FIG. 6 illustrates a system with pairs of control sensors.

FIG. 6 shows an arrangement of two control sensor pairs making it possible to detect the width of the bales (by sensor 40) in addition to the height (by sensor 39). Thus, it is possible to use such a monitoring area in combination with protective curtains comprising vertically directed detectors, in order to leave parts of the protective curtains in the active state in the case of the passage over bales of limited width. Thus, a corresponding protective curtain closes the lateral gap left open by the bale and accessible through the removal rollers.

Obviously besides the spatial shape of bales, it is also possible to incorporate other criteria (e.g., a modification to the signal by movement of the object, surface characteristics, etc.), so as to be able to reliably differentiate textile bales from other objects. If the control sensor detects an object and the superior intelligence identifies that it is not a bale, an alarm signal is generated, which initiates the protective measures. If the object detected by the control sensors is a bale, then the protective curtains are given a configuration corresponding to its size.

Figure 7:
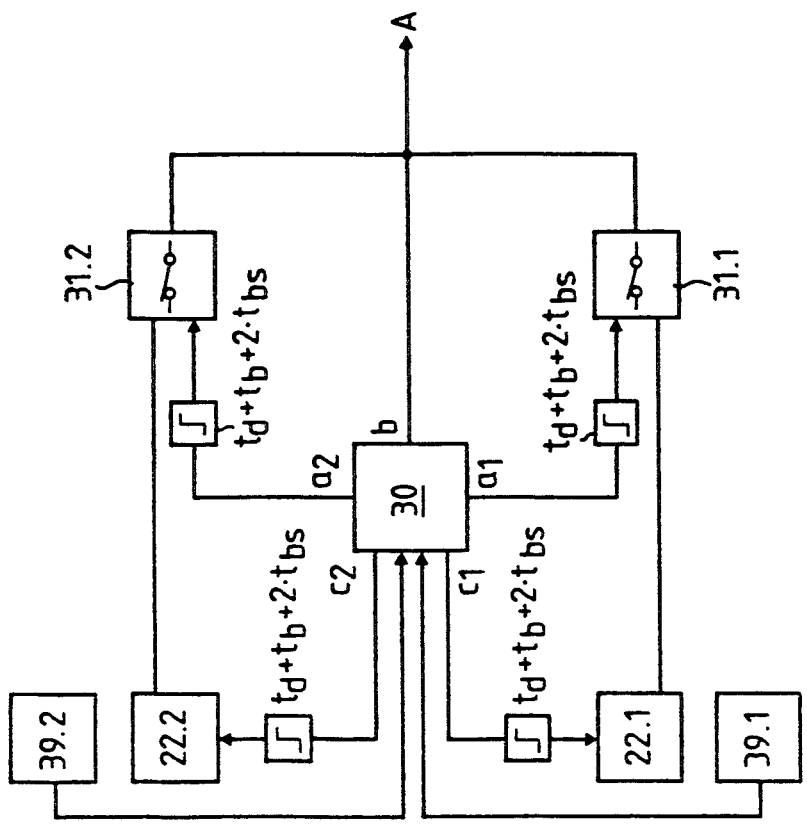
FIG. 7 illustrates a block diagram of the operation of the control means for a system with control sensors.

To further illustrate this protective principle, reference is now made to the block diagram of FIG. 7. The two control sensors 39.1 and 39.2 or corresponding control sensor pairs permanently generate signals, which are permanently processed by the intelligence 30 with the airm of knowing at all times whether at the detected points there are objects and, if so, whether they are bales or not. The system then has the following reactions:

If the front control sensor 39.1 in the movement direction detects an object identified by the intelligence 30 as a full size bale, then the switch 31.1 is opened across output $a_1$ with a delay corresponding to the distance d (cf. FIG. 3), so that alarm signals of the protective curtain 22.1 are suppressed. The same takes place with the switch 31.2, but with a time lag essentially corresponding to the distance $d+b+2.b_s$, so that the rear protective curtain 22.2 in the movement direction is deactivated later.

If one of the control sensors 39.1, 39.2 detects an object identified as not being a bale by the intelligence 30, then an alarm signal is passed on via output b.

If the front control sensor in the movement direction detects an object identified by the intelligence as a limited size bale, then across output c.1 and c.2 with delays corresponding to the distance d for protective curtain 22.1 and substantially the distance $d+b+2.b_s$ for the protective curtain 22.2, a corresponding configuration is given to said curtains.

If the front control sensor 39.1 in the movement direction detects no object, the protective curtains are deactivated (switches 31.1 and 31.2 open) or are given a configuration for restricted or smaller bales, the switches 31.1 and 31.2 are closed again with corresponding time lags, or the protective curtains, once again with corresponding lags, are brought into the "no bale" state.

d, b, $b_s$ are related to the centers of the detection areas. As the latter also have a spatial extension, this must be taken into account for the time lags during the configuration of the protective curtains and during their activation/deactivation.

Apart from the aforementioned possibility of scanning the object height, further criteria can be used for distinguishing between people and textile bales, in particular:

a) A detected object must have a minimum extension, in order to be able to associate it with textile bales.

b) The flank or edge of the object must have a specific steepness, in order to be able to associate it with the textile bales.

c) The surface of the object must have a typical shape (cotton flock structure)—pattern detection.

d) The derivation of the signal recorded by the sensors must have a typical shape, in order to be able to associate it with disturbing objects.

In order to be able to detect the bale during a removal passage with unknown bale profile, according to another embodiment of the invention it is also possible to use a mechanically acting control sensor. For detecting the object size (criteria a, e.g.) one or more pressure-sensitive sensors positioned laterally of the removal member can be used. In the same way as for an ultrasonic control sensor, use is made of a pressure remaining constant over a certain time and/or the scanned profile as a distinguishing feature between bales and other objects. The actual sensor is fixed to a movable and/or elastic assembly arm, so that during the advance of the removal member it can give way or yield with respect to the detected object or bale.

1.4 Control Sensors Integrated into the Protective Curtain

In the case of a suitable arrangement, the control sensors can also form parts of the protective curtain sensor system. In such a case the system corresponds to that described under the heading "intelligent sensors as protective sensors", or a combination of a "normal" protective curtain with the system with control sensors. It is a protective curtain, whose sensors are in part purely protective sensors and in part also take on the control sensor function.

Figure 8:
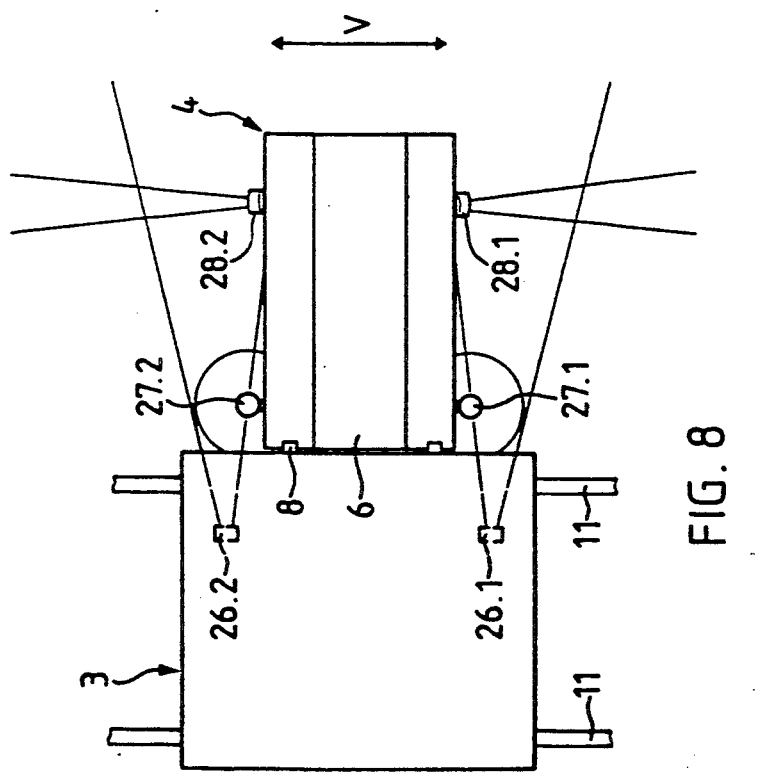
FIG. 8 illustrates a system with a protective curtain formed from partly intelligent protective sensors.

An embodiment of such a system, which is advantageous as a result of its simplicity, will be explained relative to FIGS. 8 and 9. FIG. 8 shows the arrangement of the sensors. The lateral protective curtains comprise in each case three sensors. The sensors 26.1, 26.2 and 27.1, 27.2 correspond to the sensors already described in FIGS. 1 and 2. In addition, at the removal member are provided two further sensors 28.1, 28.2, which are oriented parallel to the feed direction or are inclined slightly towards the floor, in each case, in opposite directions. For example, ultrasonic sensors are used here for all the sensors. The sensors 26 and 27 have the function of protective sensors, i.e., they generate an alarm signal for each object passing through their vicinity, no matter whether it is a bale or not. The two areas give a continuous, lateral protective curtain. The sensors 27 also take on the function of control sensors together with the sensors 28. Control sensors and protective curtains detect objects preferably at least approximately simultaneously. The superior intelligence is such that an object detected by the sensor 27 at the same time, as it is at a distance from the sensor 28 corresponding to the lateral monitoring area of the sensor 27, is identified as a bale and all the other objects are identified as endangered objects.

Figure 9:
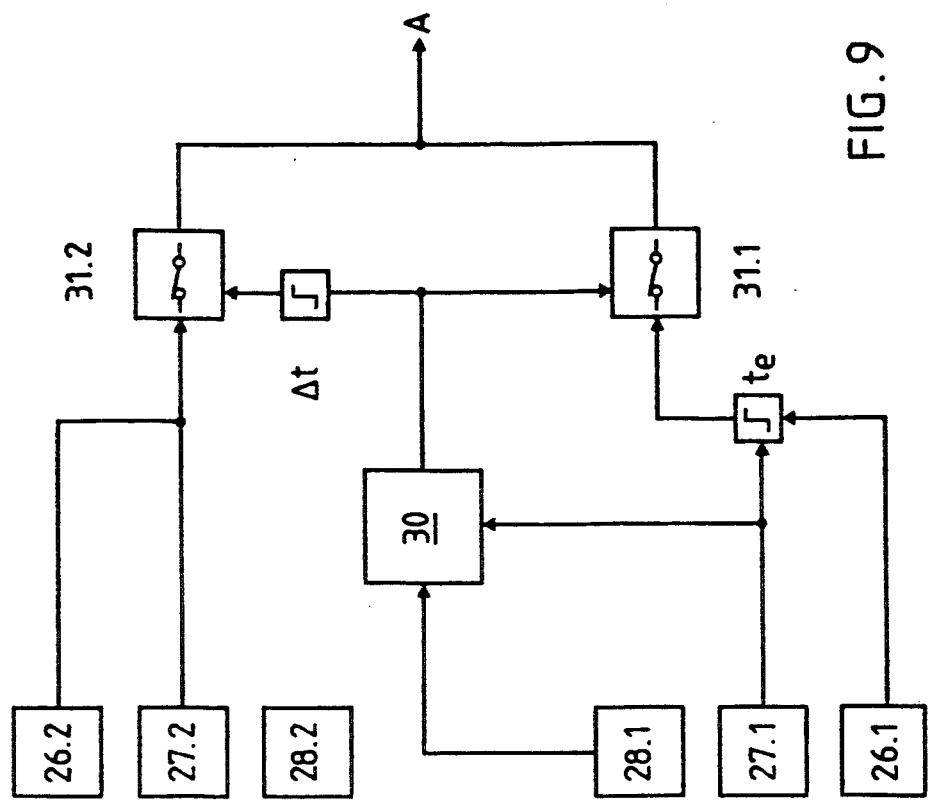
FIG. 9 illustrates a block diagram of the operation of the control means for the protective curtain with integrated control sensors.

FIG. 9 shows the working diagram of the control means of the protective curtain shown in FIG. 8. The signals of the front sensors 27.1 and 28.1 in the machine movement direction are permanently transferred to a computer 30, which permanently compares them. If the computer 30 receives from the sensors 27.1 and 28.1 signals corresponding to the criteria for a bale, they bring about an immediate opening of the switch 31.1. The switch 31.2 is opened with a time lag $\Delta t$ which (for a specific advance rate v) corresponds to the distance between the two protective curtains. The opening of the switch 31.1 is also delayed compared with the arrival of the corresponding signals from the sensors, by an evaluation time $t_e$ required by the control sensors and the computer for detecting the necessary signals and for carrying out an evaluation of the signal from the control sensor 39.1.

If the intelligence 30 receives from the sensors 27.1 or 28.1 signals corresponding to the criteria for the end of a bale, the switches 31.1 or 31.2 are closed. With regards to the time lag or delay, the same applies for the closing process as for the opening process. If one of the protective sensors 26.1, 26.2 or 27.1, 27.2 detects an object, an alarm signal is generated, that of the front protective sensors 26.1, 27.1 being delayed by the time $t_e$ and is passed on or suppressed by the corresponding switch 31.1, 31.2.

The delay time $t_e$ is necessary, so that the switches are always in the correct position when the alarm signals arrive. The down-time makes the system very similar to those having bale-neutral and intelligent protective sensors, so that the foregoing description in connection with such systems relative to the down-time applies here.

For special uses the detection range or area of the control sensors (based on the feed direction) can also be located behind the detection area or range of the protective curtain. In this case the delay time $t_e$ is correspondingly adapted or extended. Thus, the objects are firstly protected by the protective curtain and only subsequently by the control sensor or sensors, the delay time $t_e$ ensuring that in the case of bales no alarm signal is triggered. The corresponding process in particular permits constructionally favorable arrangement possibilities for the control sensors.

It must be borne in mind that the inventive process is not only suitable for the described, constructional arrangement possibilities of the control sensors, although the described arrangements are preferred.

2. Self-Monitoring of the Protective Mechanism

In order to be able to further increase the reliability of the inventive sensor system, preferably a self-monitoring system is provided. Either reference objects, reference transmitters or receivers are installed in the measuring area of the sensors and/or the transmitter of one sensor is used as a reference signal for the receiver of another sensor.

In the case of an infrared sensor system, a clearly defined reference heating source is provided at an inaccessible point of the removal machine or on the ground. A further possibility is to ignite a reference heating source at given test intervals. In this case it can also be located in the monitoring area, e.g., directly upstream of the sensor. The heating source can give off radiation intensity, e.g., roughly corresponding to a human hand, monitoring taking place not of the response per se, but also of the response time of the sensor system. For other sensors correspondingly adequate reference objects or transmitters can be activated at intervals.

Figure 10:
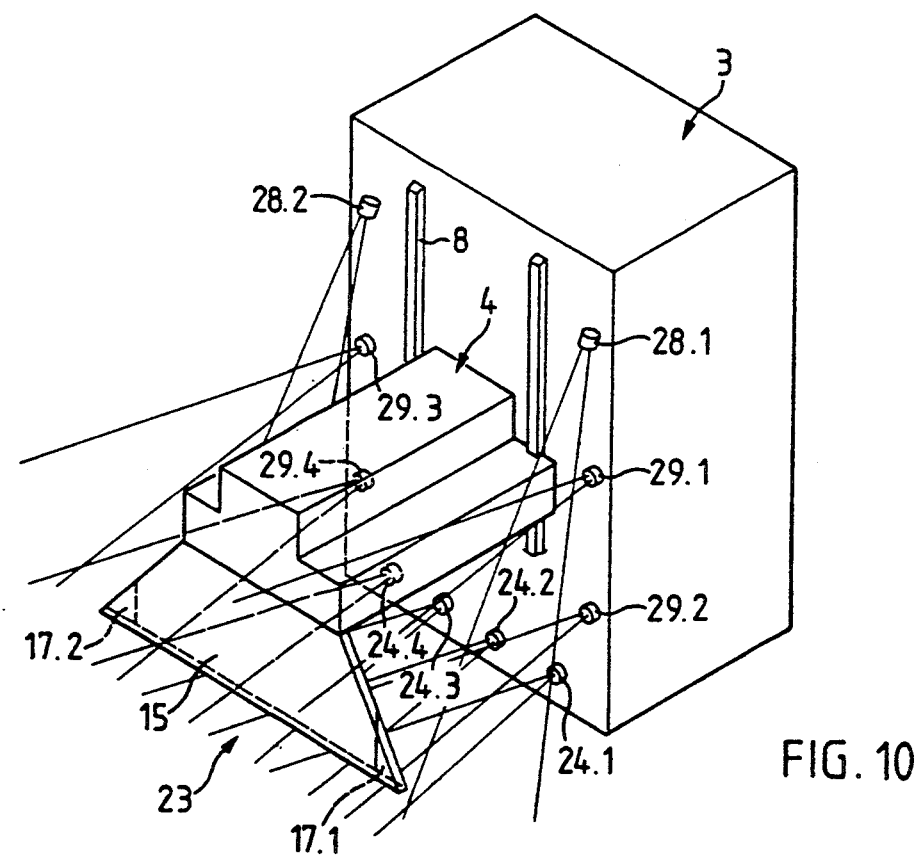
FIG. 10 illustrates an embodiment of the sensor system for allowing self-monitoring processes.

In the case of FIG. 10, an ultrasonic sensor system is used. Additionally, a protective plate 15 can be provided in the frontal area here. Between the two lateral protective curtains is provided a horizontal protective curtain 23, which is covered by several sensors 24.1 to 24.4 arranged in a horizontal line on the machine frame 3. The monitoring area is closed by the horizontal protective curtain 23, together with the lateral protective curtains, which are determined by the sensors 29.1 to 29.4 and 28.1 to 28.4 on the machine frame, as well as the protective plate 15. This makes it impossible to penetrate unnoticed from the front below and through the protective plate into the danger area under the removal rollers.

The arrangements of the elements for the self-monitoring system will be explained with the aid of said embodiment for four different variants.

It is possible to use the ultrasonic signal of two upper ultrasonic transmitters/receivers 28.1, 28.2 as the reference signal for the lower ultrasonic transmitters/receivers 27.1 to 27.4 and vice versa. At least a small part of the sound energy emitted by one sensor must be provided for the other sensor, e.g., by a reflector correspondingly fitted in the intersection area of the detection ranges of the two sensors. The transmitters/receivers are controlled in such a way that the working and test cycles of the upper and lower transmitters alternate. These functions are reversed when the test is concluded. For as long as the corresponding signals are reciprocally received, the correct function of the sensor system is verified. This can be monitored by a corresponding monitoring unit. As soon as a signal of the sensor located in the working cycle is not received by the testing sensor, special measures can be initiated, e.g., a disconnection of the machine, warning signal, etc.

If the two upper sensors 28 are designed as distance measuring devices, they can be tested in that at certain reference distances, e.g. with respect to the ground or floor, they are compared with the desired value and reciprocally. For as long as the corresponding values coincide, the sensors are functioning correctly. This testing method can also be used for sensors fitted on the removal member, i.e., at a variable height, because the computer can calculate the height of the removal member from the initial height and the delivery.

A third possibility is to fit two reference objects 17.1, 17.2 with good ultrasonic reflection on the lateral edge of the protective plate 15. In certain circumstances the protective plate extending into the lateral monitoring area can itself be used as a reference object. It is fundamentally also possible to fit reference objects to the removal member, e.g., also within the action area of the protective curtain. The condition is naturally that the objects reflect very little in planned manner, or e.g., have such a large spacing from the beam or radiating axis of the sensors, that the sound power coming back from the reference objects is not sufficient to be recorded by the sensor. In a periodically recurring test cycle it is merely either necessary to amplify the transmitting power, increase the sensitivity of the receiver, or reduce the response threshold of the signal received, so that the reference object is detected and, therefore, the sensor can be tested. It is obviously also possible to replace the reference objects 17.1, 17.2 by special reference sensors. In the same way, in the case of an infrared sensor system the reference objects 17.1, 17.2 can be two heating sources.

The fourth possibility is to use the bale groups as a reference object (not usable for bale-neutral sensors). If the machine is processing bales, then the protective function of the lateral protective curtains will, as stated, be taken over by the bales. During this time the sensors must detect the bales. If the machine is between two bales, i.e., the monitoring areas are determined by the sensors, then there must be no object within the same. With these two criteria it is possible to establish whether the sensor system is operating in a completely satisfactory manner and whether no object is located in the monitoring areas apart from the bales to be processed. As the two possible incorrect or fault states (sensor defect and person in the monitoring area) must initiate the same protective measures, it is unimportant whether or not a distinction is made between them.

According to a preferred variant, particularly is no sensory protective devices are used, for the self-monitoring of the sensor system a reference object is located directly at the front of the casing structure 6 of the removal member 4.

In order to further increase the security and reliability of the protective means, it must be ensured that preferably all the signals are transmitted active LOW.

It must be ensured that the protective means is not usable solely with horizontally bale removal machines. If the removal member is moved along a sloping surface, it is here again important to so design the sensor system and control system that the monitoring area together with the fixed objects forms a closed envelope around the danger area.

Although the control principle has been only described hereinbefore in conjunction with a sensory protective system, it can be used in the same way for mechanical protective systems. In this case the mechanical protective mechanisms are so controlled that during the relative movement between the removal machine and the bales they do not interfere with the latter, e.g., the protective plates are raised or pivoted away. It is also possible to release stopping means for the mechanical protection means as a function of control sensor signals, so that the mechanical protection means on contacting bales are movable relative to their otherwise fixed position.

3. Control Device

Preferably all the control and monitoring functions are taken over by a unitary control module, which represents the aforementioned intelligence of the protection system. The control device (computer) evaluates the data of the control sensors for controlling the protective sensors and the measurements of all the sensors are permanently monitored and, if necessary the necessary, protective measures and, in particular, the disconnection of the removal rollers are initiated. For this purpose the control device is supplied with additional data, e.g., from the reference sensors (e.g., ambient temperature), as well as data from the reference objects. The data concerning the bale profile are either stored in the control means of the sensor system or are made available to the machine by the master control system and are periodically interrogated or polled.

The control unit is preferably installed on or in the machine frame or in the removal member. If necessary, it can be fitted to a control console remote from the machine. Here again, it must be ensured that all the signals are transmitted active LOW, so that in the case of a failure of a complete system group, the protective measures are activated.

With respect to the protection device explained with the aid of the aforementioned bale removal machine, it must be stressed that the invention can also be used with other textile machines. In principle, the invention can be used in conjunction with all processing machines, particularly movable or mobile processing machines. However, it is also possible to rigidly arrange, e.g., a bale removal machine and to move the bales, e.g., on a conveyor belt relative to the machine.

We claim:

1. A process for the sensory control of a protective system on a textile machine, including at least one control sensor, an evaluation unit connected to said at least one control sensor, and at least one protective curtain, said textile machine comprising a removal member for removing fiber from fiber bales arranged in a bale profile, said process comprising the steps of:
  performing an initial pass with said at least one control sensor in an advancing direction along said fiber bales while scanning and monitoring said fiber bales by means of said at least one control sensor;
  detecting a bale by means of said evaluation unit and said at least one control sensor;
  deactivating said at least one protective curtain in response to said step of detecting a bale, immediately before a bale is reached by said protective curtain;
  during passes of said at least one control sensor subsequent to said initial pass, activating and deactivating said at least one protective curtain as a function of at least one of (i) said bale profile and (ii) signals provided by said at least one control sensor; and
  initiating a protective measure in response to detection of a foreign object by means of said at least one protective curtain.

2. The process according to claim 1, wherein:
  said step of performing an initial pass of said at least one control sensor comprises scanning said bale profile; and
  said process further comprises the step of:
  inputting, to said evaluation unit, one of (i) said bale profile and (ii) a derivative of said bale profile.

3. The process according to claim 1, wherein:
  said step of performing an initial pass of said at least one control sensor comprises determining said bale profile, and said evaluation unit comprises a pattern-detectable evaluation unit, and wherein:
  said process further comprises the step of:
  inputting a bale profile to said evaluation unit.

4. The process according to claim 1, wherein:
  said at least one control sensor comprises a control sensor having a detection area;
  said at least one protective curtain comprises a protective curtain having a detection area;

said control sensor is situated with respect said protective curtain and with respect to a bale removal path of the textile machine for detecting a foreign object along said bale removal path at a time $t_d$ before said foreign object comes into the vicinity of said at least one protective curtain, wherein $t_d = d/v$, where v is the relative velocity of the textile machine with respect to the fiber bales and d is the distance between said detection area of said control sensor and said detection area of said protective curtain.

5. The process according to claim 1, comprising the step of:
detecting a foreign object substantially simultaneously by said at least one control sensor and said at least one protective curtain.

6. The process according to claim 1, comprising the step of:
detecting a foreign object by said at least one protective curtain and, subsequently, by said at least one control 7. The process according to claim 5, comprising the step of:
supplying an output signal of said at least one protective curtain to said evaluation unit after a time delay $t_e$, where $t_e$ is greater than or equal to a length of time for detecting and processing a signal from said at least one control sensor.

8. The process according to claim 2, comprising the step of:
continuously adjusting a monitoring range of said at least one protective curtain as a function of said bale profile determined by said at least one control sensor such that space occupied by said bales is not within said monitoring range of said at least one protective curtain.

9. The process according to claim 1, comprising the step of:
controlling or regulating sensitivity of said at least one control sensor as a function of ambient parameters.

10. The process according to claim 1, comprising the step of:
self-monitoring said at least one control sensor by activating at least one reference object at intervals in a detection area of said at least one control sensor.

11. The process according to claim 1, comprising the step of:
using an output signal of said at least one control sensor for controlling mechanical protection means.

12. A bale removal machine comprising:
a machine frame;
a removal member operatively connected to said machine frame;
at least one protective curtain for detecting the presence of an object;
an evaluation unit;
at least one control sensor, located on at least one of said machine frame and said removal member, for scanning an area positioned laterally of said removal member, said at least one control sensor being connected to said evaluation unit for controlling said at least one protective curtain.

13. The bale removal machine according to claim 12, wherein said object has a maximum dimension, wherein:
said at least control sensor comprises at least one control sensor on a respective opposite lateral side of said removal member, spaced apart by a distance which is greater than said maximum dimension of said object.

14. The bale removal machine according to claim 13, wherein:
said at least one control sensor on a respective opposite side of said removal member are spaced apart by a distance equal to or greater than 1.2 meters.

15. The bale removal machine according to claim 12, wherein:
said at least one protective curtain comprises a sensor system, wherein said sensor system and said at least one control sensor are vertically adjustably mounted on said machine frame.

16. The bale removal machine according to claim 12, wherein:
at least one of said at least one control sensor is a distance measuring device.

17. The bale removal machine according to claim 12, wherein:
at least one of said at least one control sensor is an ultrasonic sensor.

18. The bale removal machine according to claim 12, wherein:
at least one of said at least one control sensor is an optical sensor.

19. The bale removal machine according to claim 12, wherein:
at least one of said at least one control sensor is a mechanical sensor.

20. The bale removal machine according to claim 12, wherein:
at least one of said at least one control sensor is oriented at least approximately parallel to a movement direction of said removal member.

21. The bale removal machine according to claim 12, wherein:
said at least one protective curtain comprises a sensor system, and wherein:
said bale removal machine further comprises:
at least one reference object, for self monitoring of said sensor system, said at least one reference object being located within an area to be detected by said sensor system.

22. The bale removal machine according to claim 21, wherein:
said bale removal machine comprises a front side, and wherein:
said bale removal machine further comprises:
a protective plate positioned proximate said front side of said bale removal machine, projecting at least into an area monitored by said at least one protective curtain.

23. The bale removal machine according to claim 22, wherein:
said bale removal machine comprises a pair of opposite lateral sides; and
said at least one reference object comprises a reference object positioned on an inside of each of a pair of lateral ends of said protective plate.

24. The bale removal machine according to claim 12, wherein:
said at least one protective curtain comprises a sensor system, wherein:
said removal member comprises a casing structure, said casing structure having a front side; and wherein
said bale removal machine further comprises:
at least one reference object, for self monitoring of said sensor system, said at least one reference object being located on said front side of said casing structure of said removal member.

* * * * *